United States Patent [19]

Umezawa

[11] Patent Number: 4,461,374
[45] Date of Patent: Jul. 24, 1984

[54] SYSTEM FOR CONTROLLING AN ELECTRO-MAGNETIC CLUTCH FOR AUTOMOBILES

[75] Inventor: Mitsuo Umezawa, Akikawa, Japan
[73] Assignee: Fuji Jukogyo Kabushiki Kaisha, Tokyo, Japan
[21] Appl. No.: 281,253
[22] Filed: Jun. 15, 1981
[30] Foreign Application Priority Data
Aug. 12, 1980 [JP] Japan ................... 55-111481
[51] Int. Cl.³ .............................. F16D 27/16
[52] U.S. Cl. ...................... 192/21.5; 192/0.092; 192/0.076; 192/0.052
[58] Field of Search ........... 192/3.58, 3.56, 21.5, 192/0.08, 84 A, 103 R, 0.033, 0.076, 0.052

[56] References Cited

U.S. PATENT DOCUMENTS

| | | | |
|---|---|---|---|
| 2,688,388 | 9/1954 | Gill | 192/21.5 |
| 3,730,317 | 5/1973 | Jaeschke | 192/84 A |
| 3,752,284 | 8/1973 | Brittain | 192/0.052 |

FOREIGN PATENT DOCUMENTS 809490 2/1959 United Kingdom .
860545 2/1961 United Kingdom .
955602 4/1964 United Kingdom .
993632 6/1965 United Kingdom .

Primary Examiner—George H. Krizmanich
Assistant Examiner—M. Manley
Attorney, Agent, or Firm—Martin A. Farber

[57] ABSTRACT

A system for controlling an electro-magnetic clutch of an internal combustion engine mounted on a car which is capable of eliminating residual magnetism during the deceleration of the car. The electro-magnetic clutch has a drive member secured to a crankshaft of the internal combustion engine, a driven member adjacent the drive member and a magnetizing coil provided in one of the members. An accelerator switch is provided for detecting the deceleration of the car and a car speed switch is provided for producing a signal when the car speed decreases below a predetermined speed. Both of output signals of the accelerator switch and the car speed switch are fed to a control circuit. The control circuit is such that the current flowing through the magnetizing coil is inverted upon occurrence of these output signals of the accelerator switch and the car speed switch, so that the residual magnetism in the clutch is eliminated.

16 Claims, 5 Drawing Figures (PRIOR ART)

SYSTEM FOR CONTROLLING AN ELECTRO-MAGNETIC CLUTCH FOR AUTOMOBILES

BACKGROUND OF THE INVENTION

The present invention relates to a system for controlling an electro-magnetic clutch for automobiles, and more particularly to a system for controlling an electro-magnetic clutch which is capable of eliminating residual magnetism therein by applying inverted current to the magnetic coil, when the car speed is lower than a predetermined value.

An electro-magnetic clutch for a car comprises an annular drive member secured to the crankshaft of the engine, a magnetizing coil provided in the drive member, a driven member secured to the input shaft of the transmission spaced by a gap from the drive member, and a shift lever for changing gears in the transmission. The shift lever is provided with a switch for the magnetizing coil, which is actuated by operating the shift lever. When the shift lever is shifted to a gear engaging position, the switch is closed so that electric current flows through the magnetizing coil to magnetize the drive member. As the accelerator pedal is depressed, the clutch current passing the coil increases. The magnetic flux intensifies in the gap between the drive member and the driven member, so that the driven member is coupled to the drive member. Thus, the car can be smoothly started by suitably operating the accelerator pedal with slippage in the clutch. When the clutch current is cut off, the clutch is disconnected.

FIG. 5 shows variations of the clutch current and car speed. When the car speed is higher than a predetermined speed $V_1$, a rated clutch current Im flows in the coil. When the car speed is lower than the speed $V_1$, the clutch current is shut off. If the time $t_1$ from the car speed $V_1$ to zero is extremely short, for example, as during rapid deceleration, magnetism remains in the magnetic material of the clutch by hysteresis. The residual magnetism causes the drive member to attract the driven member, which will cause an unpleasant rattling noise in the driving system.

SUMMARY OF THE INVENTION

In order to overcome such defects, the present invention provides a system for an electro-magnetic clutch, which is adapted to apply an inverted clutch current to the clutch coil when the car speed decreases below a predetermined speed under the condition that the accelerator pedal is released to eliminate the residual magnetism.

Other objects and features of the present invention will be more apparent from the following description with reference to the accompanying drawings.

DETAILED DESCRIPTION OF THE PREFERRED EMBODIMENTS

Figure 1:
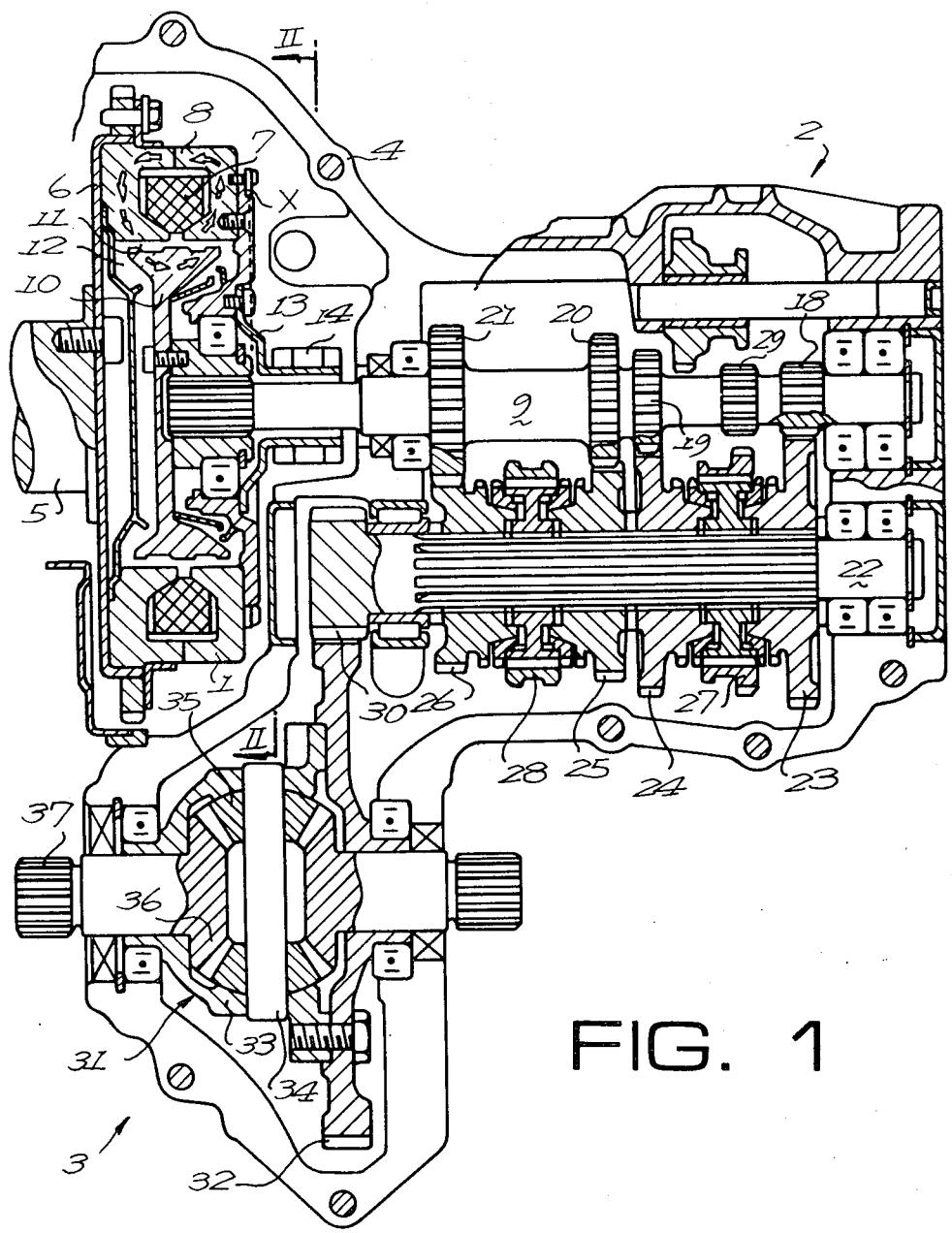
FIG. 1 is a sectional view of a transmission with an electro-magnetic powder clutch used in a system according to the present invention.
Figure 2:
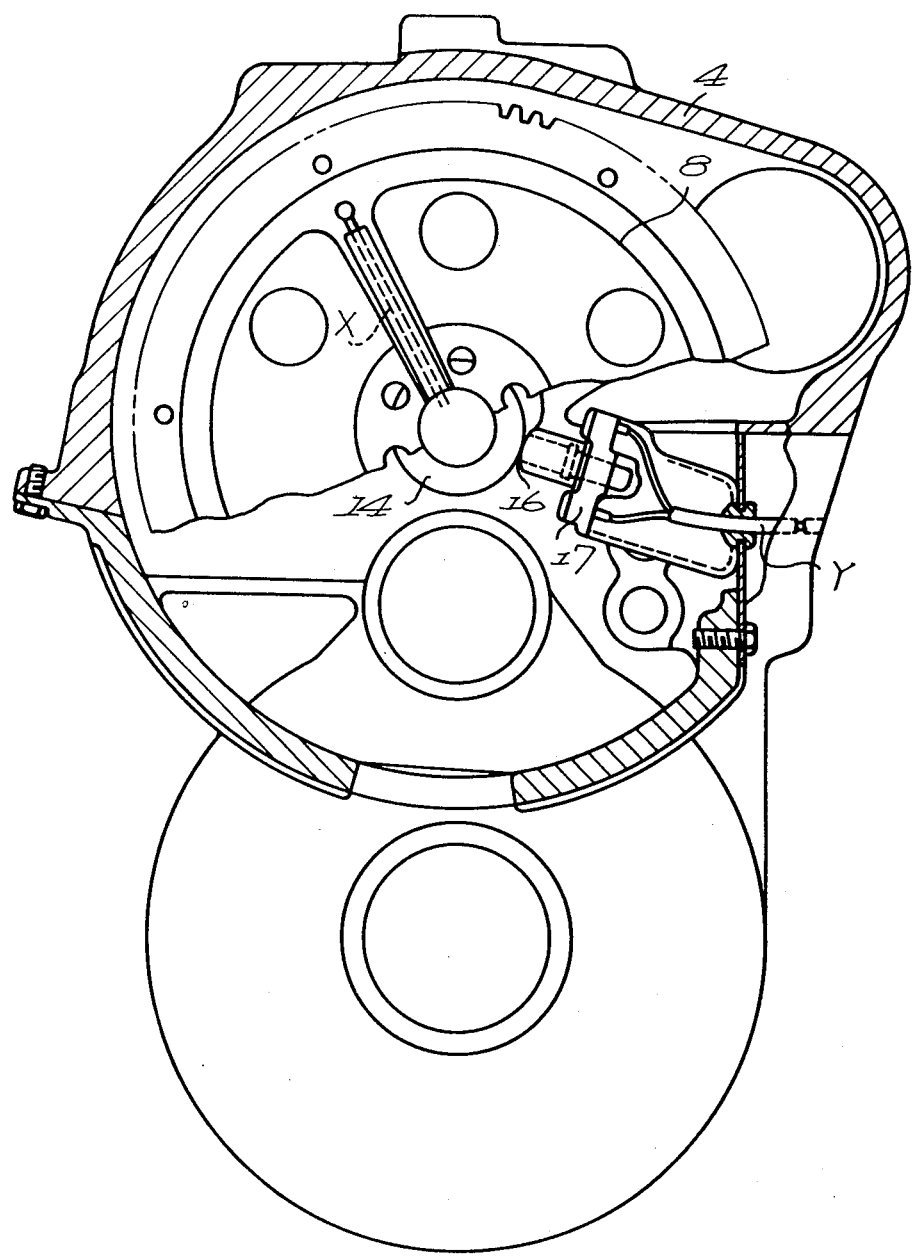
FIG. 2 is a sectional view taken along the line II—II of FIG. 1.

Referring to FIGS. 1 and 2 showing a transmission to which the present invention is applied, is an electro-magnetic power clutch 1 is operatively connected to a four-speed transmission 2 which in turn is operatively connected to a final reduction device 3.

The electro-magnetic powder clutch 1 is provided in a clutch case 4 and comprises a drive plate 6 attached to the end of a crankshaft 5 of an internal combustion engine (not shown), an annular drive member 8 secured to the drive plate 6, a magnetizing coil 7 provided in the drive member 8, and a driven member 10 secured by a spline engagement to an input shaft 9 of the transmission 2, spaced leaving an annular gap 11 from the drive member 8. Powder of magnetic material is provided in a powder chamber 12 and the gap 11 is adapted to be filled with the powder. A cap 13 is secured to the drive member 8. The cap 13 has a cylindrical portion coaxial with the input shaft 9, to which slip rings 14 are secured. The slip rings 14 are connected to the drive member 8 by a lead X. Brushes 16 (FIG. 2) press against the slip rings 14 and are supported in a holder 17 and connected to hereinafter described control means by a lead Y.

In such a construction, the drive plate 6 and the drive member 8 rotate together with the crankshaft 5 and the magnetic powder which has been sealed into the powder chamber 12 is drawn to the inner surface of the drive member 8 by centrifugal force. If the magnetizing coil 7 is excited by the current applied through the lead Y, the brushes 16, the slip rings 14 and the lead X, the drive member 8 is magnetized to produce a magnetic flux passing through the driven member 10 as shown by arrows in FIG. 1. Thus, the powder aggregates in the gap 11, so that the powder of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, respectively. Driven gears 23 to 26 are rotatably mounted on the output shaft 22 parallel to the input shaft 9. Each of the driven gears 23 and 24 is adapted to be engaged with the output shaft 22 by operating a synchromesh mechanism 27 and each of driven gears 25 and 26 is engageable with the output shaft 22 by a synchromesh mechanism 28 in a well known manner. Further, a reverse drive gear means 29 is provided. Thus, by operating a shift level S (FIG. 3) of the transmission, the driven gear 23 is coupled integrally with the output shaft 22 by the synchromesh mechanism 27 and the 1st speed is obtained on the output shaft 22 because the power of output shaft 9 is greatly decreased, and the 2nd, 3rd and 4th speed may be respectively obtained accordingly.

Further, provided on an end of the output shaft 22 is an output gear 30 which engages with a ring gear 32 in a differential 31 of the final reduction device 3 to transmit the output of the output shaft 22 of the transmission 2 directly from the ring gear 32 to a side gear 36 through a case 33, a spider 34 and a pinion 35, and further to driving wheels of a vehicle through a wheel shaft 37.

Figure 3:
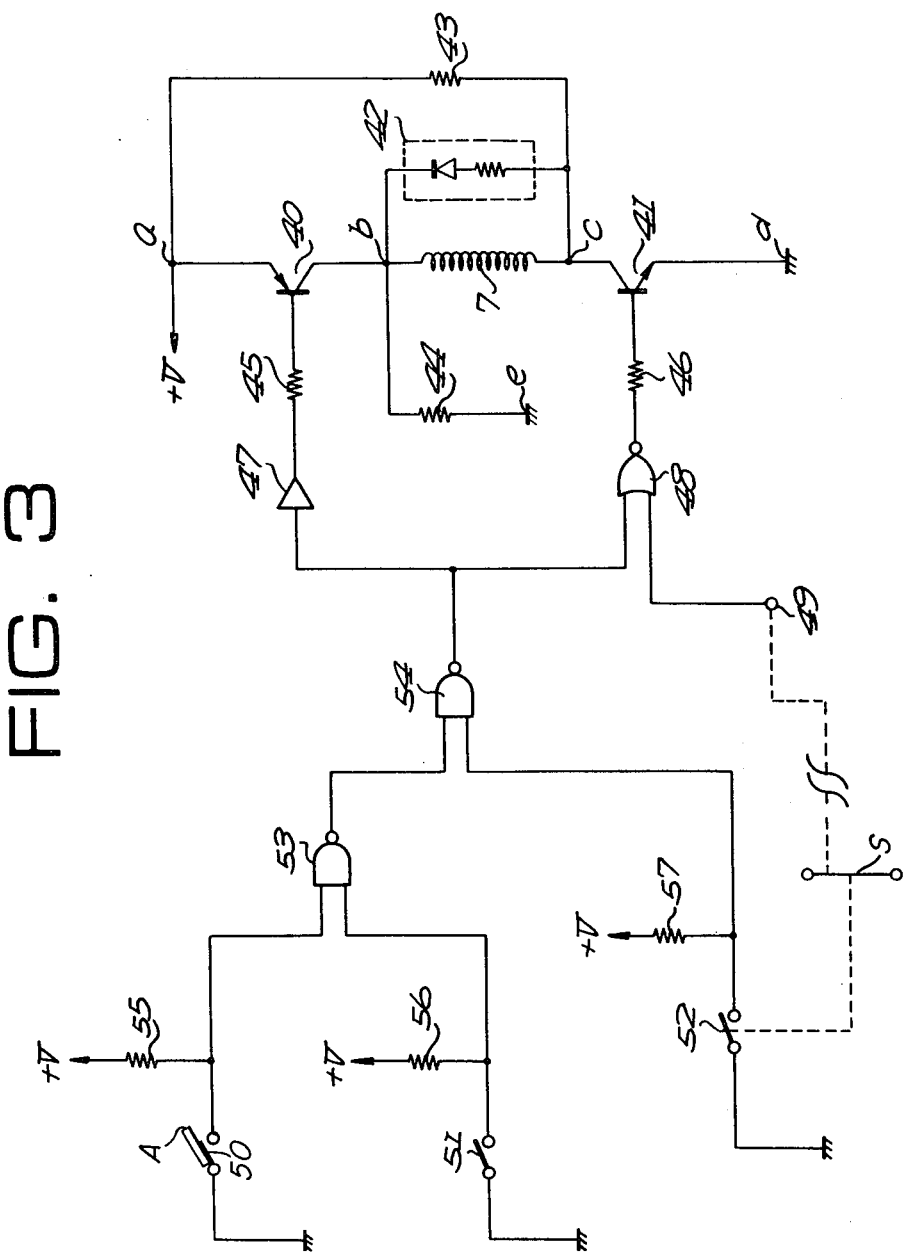
FIG. 3 is a circuit showing an example of the system of the present invention.

FIG. 3 shows an arrangement of the control circuit, in which a transistor 40 of a PNP type and the transistor 41 of a NPN type are connected respectively to opposite ends of the magnetizing coil 7. An emitter of the transistor 40 is connected to an electric source, while an emitter of the transistor 41 is grounded. A commutation circuit 42 comprises a diode and a resistor and is connected to both ends of the coil 7. A resistor 43 for inverted current is connected to the electric source and the collector of the transistor 41, and a resistor 44 for inverted current is connected between the collector of the transistor 40 and the ground. The bases of the transistors 40, 41 are connected to resistors 45, 46, respectively. The resistor 45 is connected to a NAND gate 54 through a buffer 47 and the resistor 46 is connected to the NAND gate 54 through a NOR gate 48. On the other hand, a clutch control signal is applied to the other input 49 of the NOR gate 48. The input 49 is at a high level during the operation of the shift lever S. An accelerator switch 51 is on when the accelerator pedal A of the car is depressed, a car-speed switch 51 is on when the car speed is higher than a predetermined speed, and a shift lever switch 52 provided on the shift lever is on during the operation of shift lever. One end of each switch 50, 51 and 52 is connected to the ground, while the other end of the accelerator switch 50 is connected to a NAND gate 53, the other end of the car speed switch 51 is connected to the NAND gate 53, and the other end of the shift lever switch 52 is connected to one input of the NAND gate 54. The output of the NAND gate 53 is also connected to another input of the NAND gate 54. Positive electric potential is applied to the other ends of switches 50, 51 and 52 through resistors 55, 56, and 57, respectively.

Operation of the system according to the present invention will be explained hereinafter.

When the car speed is higher than the predetermined speed $V_1$, the switch 51 is closed, and hence a low level voltage is applied to the NAND gate 53. Thus, the output of the NAND gate 53 is a high level irrespective of the signal from the accelerator switch 50. When the shift lever is not operated, the shift-lever switch 52 is turned off. A high level voltage is applied to the NAND gate 54, so that the output of the NAND gate 54 is at a low level. The low level output is fed to the transistor 40 through the buffer 47 and the NOR gate 48. Since the input 49 of the NOR gate 48 is low, the output of the NOR gate 48 is a high level. Thus, transistors 40 and 41 are turned on, so that the current flows through the coil 7 in the order of a→b→c→d. Accordingly, the clutch is connected.

When the car speed is lower than the predetermined speed $V_1$, the car speed switch 51 is turned off. A high level voltage is applied to the NAND gate 53, the output of which is at a high or a low level depending on the on or off condition respectively of the accelerator switch 50. When the accelerator pedal is released, the accelerator switch 50 is turned off, so that a high level voltage is applied to the NAND gate 53.

Thus, the output of the NAND gate 53 goes to a low level and the output of the NAND gate 54 changes to a high level irrespective of the condition of the shift lever switch 52. The high level output of the NAND gate 54 causes the transistor 40 to turn off and the output of the NOR gate 48 goes to a low level irrespective of the input 49. As a result the transistor 41 is also turned off. Thus, the current flows in the order of a→c→b→e, and accordingly, the inverted current flows through the coil 7. Therefore, the residual magnetism is not produced in the clutch.

Figure 4:
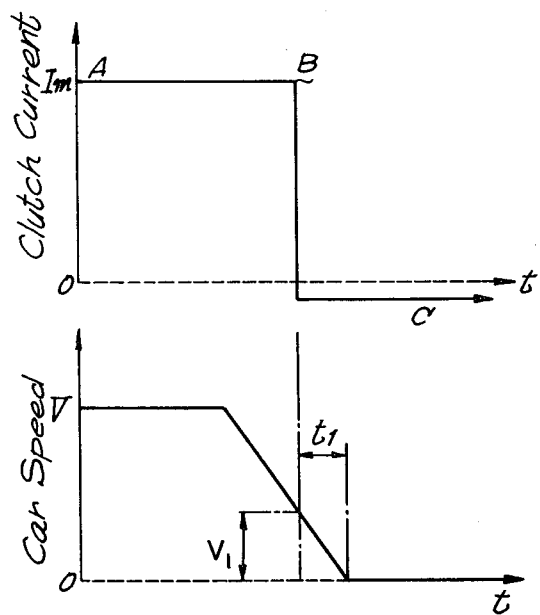
FIG. 4 is a graph showing variations of clutch current and car speed in the system of the present invention.
Figure 5:
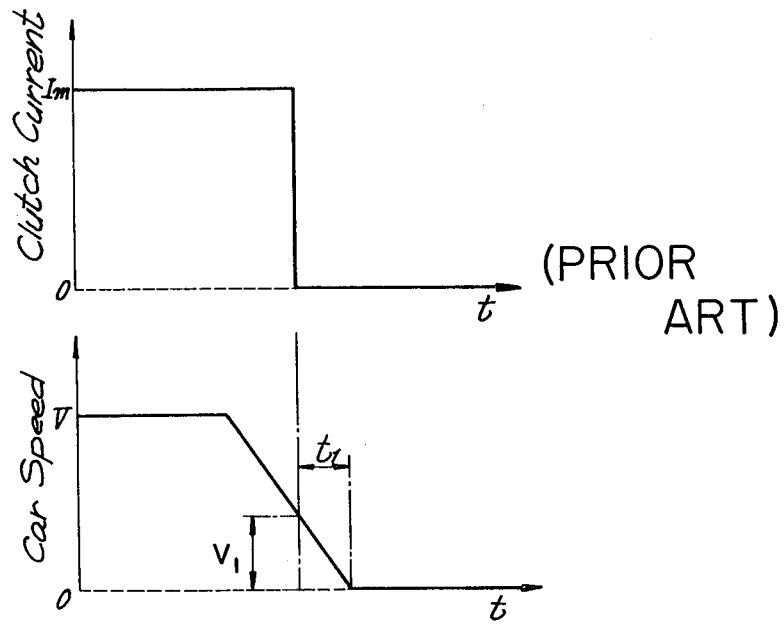
FIG. 5 is a graph showing variations of clutch current and car speed in a conventional system.

In FIG. 4 showing the relations between the clutch current and the car speed, line A indicates the condition when the car speed is more than the predetermined value $V_1$ and the excitation current Im flows through the magnetizing coil. If the accelerator pedal is released and the accelerator switch 50 is turned off, inverted current flows as shown.

In accordance with the present invention, the residual magnetism is removed by the inverted current when the car speed decreases below a predetermined speed in the condition when the accelerator pedal is released. Thus, it is possible to prevent the occurrence of unpleasant rattling noise.

What is claimed is:

1. In a system for controlling an electro-magnetic clutch for an internal combustion engine mounted on a car, said clutch having a drive member secured to a crankshaft of said internal combustion engine, a driven member adjacent said drive member, and a magnetizing coil provided in one of said members, and said car having a transmission secured to said driven member having multi-stage change gears, comprising deceleration detecting means for providing an output signal having one logic level upon deceleration of the car, car speed detecting means for providing an output signal having one logic level when the car speed is lower than a predetermined speed, logic circuit means response to said output signals of said deceleration detecting means and of said car speed detecting means for providing an output signal having one logic level, switch circuit means responsive to said circuit means for controlling current flowing through said magnetizing coil, and said switch circuit means for sending the current through said magnetizing coil in an inverted polarity direction upon occurrence of said output signal having said one logic level from said circuit means and, respectively, for sending the current through said magnetizing coil in a normal polarity direction for engaging said members of said clutch upon occurrence of another logic level of the output signal from said circuit means.

2. A system for controlling an electro-magnetic clutch of an internal combustion engine according to claim 1 wherein said switch circuit means is composed of a pair of transistors.

3. The system for controlling an electro-magnetic clutch of an internal combustion engine according to claim 1, wherein
the condition of said inverted polarity direction occurs even in an engaged condition of one of said multi-stage change gears.

4. The system for controlling an electro-magnetic clutch of an internal combustion engine according to claim 1, wherein
said deceleration detecting means is a switch mechanically connected to an accelerator pedal of the vehicle.

5. In a system for controlling an electro-magnetic clutch of an internal combustion engine mounted on a vehicle, which has a drive member secured to a crankshaft of said internal combustion engine, a driven member adjacent said drive member, a transmission secured to said driven member and having multi-stage change gears and a shift lever therefor, a magnetizing coil provided in one of said members, and an electric circuit means including said magnetizing coil which is capable of passing excitation current through said magnetizing coil in a normal direction, the improvement comprising a deceleration switch means for producing an output signal having one logic level in a deceleration position thereof, a vehicle speed detecting means for providing an output signal in a low speed range lower than a predetermined speed, logic circuit means responsive to said output signals of said vehicle speed detecting means and of said deceleration switch means for providing an output signal having logic levels, said electric circuit means being responsive to said output signal of said logic circuit means for controlling the current flowing through said magnetizing coil, said electric circuit means for passing the current through said magnetizing coil with inverted polarity when the output signal from said logic circuit means has one logic level when the output signal of said vehicle speed detecting means occurs in said low speed range and in the deceleration position of said deceleration switch means, and respectively for passing the excitation current through said magnetizing coil in said normal direction when the output signal of said logic circuit means has another logic level.

6. The system for controlling an electro-magnetic clutch of an internal combustion engine according to claim 5, wherein said electric circuit means includes a pair of transistors with collector-emitter paths in series with said magnetizing coil therebetween.

7. The system for controlling an electro-magnetic clutch of an internal combustion engine according to claim 5, wherein said deceleration switch means is a switch mechanically connected to an accelerator pedal of the vehicle.

8. The system for controlling an electro-magnetic clutch of an internal combustion engine according to claim 5, further comprising shift lever switch means for producing an output signal having one logic level during a shifting operation of the shift lever of said transmission, said logic circuit means comprises a first NAND gate having a first input operatively connected to said deceleration switch means and another input connected to a shift lever switch means.

9. The system for controlling an electro-magnetic clutch of an internal engine according to claim 8, wherein said logic circuit means further comprises a second NAND gate having an input connected to said deceleration switch means, an output connected to said first input of said first NAND gate, and another input connected to said vehicle speed detecting means.

10. The system for controlling an electro-magnetic clutch of an internal combustion engine according to claim 9, further wherein said logic circuit means further comprises a NOR gate having an input connected to the output of said first NAND gate and another input receiving a clutch control signal having one logic level when the shift lever is moving.

11. The system for controlling an electro-magnetic clutch of an internal combustion engine according to claim 9, further wherein said electric circuit means includes a pair of transistors with collector-emitter paths in series with said magnetizing coil therebetween, one of said transistors is a NPN transistor and the other of said transistors is a PNP transistor, a base of one of said transistors is connected to the output of said NOR gate and a base of another of said transistors is connected to the output of said first NAND gate.

12. The system for controlling an electro-magnetic clutch of an internal combustion engine according to claim 11, further wherein said electric circuit means further comprises a commutation circuit having a first resistor and a diode in series and together connected in parallel to said magnetizing coil, a second resistor is connected at one end to a junction of said commutation circuit and one end of said magnetizing coil, a third resistor is connected at one end thereof to another end of said magnetizing coil, said one ends of said second and third resistors and said collector-emitter paths of said transistors are connected across voltage.

13. The system for controlling an electro-magnetic clutch of an internal combustion engine according to claim 8, wherein said current flows through the magnetizing coil with the inverted polarity even when the shift lever is in a position to engage said change gears.

14. In a system for controlling an electro-magnetic clutch of an internal combustion engine mounted on a vehicle, which has a drive member secured to a crankshaft of said internal combustion engine, a driven member adjacent said drive member, a transmission secured to said driven member and having multi-stage change gears and a shift lever therefor, a magnetizing coil provided in at least one of said members, and an electric circuit means including said magnetizing coil which is capable of passing excitation current through said magnetizing coil in a normal direction, the improvement comprising means for detecting vehicle speed lower than a predetermined value, means for detecting deceleration of the vehicle, and said electric circuit means including means for passing current through the magnetizing coil in an inverted direction relative to said normal direction in a deceleration condition of the vehicle when the vehicle speed is lower than said predetermined value.

15. The system for controlling an electro-magnetic clutch of an internal combustion engine according to claim 14, wherein said electro-magnetic clutch is a powder clutch.

16. The system for controlling an electro-magnetic clutch of an internal combustion engine according to claim 14, wherein said deceleration detecting means is a switch mechanically connected to an accelerator pedal of the vehicle.

* * * * *